US009628283B2

(12) United States Patent
Cooper

(10) Patent No.: US 9,628,283 B2
(45) Date of Patent: Apr. 18, 2017

(54) REVERSE POWERING SYSTEM FOR TELECOMMUNICATIONS NODE

(71) Applicant: BRITISH TELECOMMUNICATIONS PUBLIC LIMITED COMPANY, London (GB)

(72) Inventor: Ian Robert Cooper, London (GB)

(73) Assignee: BRITISH TELECOMMUNICATIONS PUBLIC LIMITED COMPANY, London (GB)

( * ) Notice: Subject to any disclaimer, the term of this patent is extended or adjusted under 35 U.S.C. 154(b) by 0 days.

(21) Appl. No.: 14/907,183

(22) PCT Filed: Jun. 5, 2014

(86) PCT No.: PCT/GB2014/000214
§ 371 (c)(1),
(2) Date: Jan. 22, 2016

(87) PCT Pub. No.: WO2015/011431
PCT Pub. Date: Jan. 29, 2015

(65) Prior Publication Data
US 2016/0164687 A1 Jun. 9, 2016

(30) Foreign Application Priority Data

Jul. 23, 2013 (EP) ..................... 13250085

(51) Int. Cl.
*H04L 12/10* (2006.01)
*H02J 3/06* (2006.01)

(52) U.S. Cl.
CPC ..................... *H04L 12/10* (2013.01)

(58) Field of Classification Search
CPC ....................................... H02J 3/06
(Continued)

(56) References Cited
U.S. PATENT DOCUMENTS
9,001,974 B2  4/2015  Humphrey 9,300,815 B2  3/2016  Cooper

FOREIGN PATENT DOCUMENTS

EP    2 362 626 A1    8/2011
WO   WO 2009/138710 A1   11/2009
(Continued)

OTHER PUBLICATIONS

International Search Report for PCT/GB2014/000214, mailed Aug. 5, 2014, 2 pages.
(Continued)

*Primary Examiner* — Robert Deberadinis
(74) *Attorney, Agent, or Firm* — Patterson Thuente Pedersen, P.A.

(57) ABSTRACT

To initiate the transmission of electrical power over a telecommunications connection from a power-collecting telecommunications interface unit such as a customer premises equipment, connectable to a power supply, to a power-receiving unit such as a curbside electrical/optical interface, when a connection is first established, or the collecting unit is first powered up, or in order to re-establish connection after a power outage, control signals are transmitted between low-power modems in the interface units using a low-power communications protocol. This allows the controlled initiation of a larger power output and a higher speed exchange of data once the full telecommunications connection has been established. A low-powered beacon signal is transmitted over the telecommunications connection by the power-collecting telecommunications interface unit on connection to a power supply, for detection by the power-receiving telecommunications interface unit. In the event of a loss of power at the input, the low power modem initiates power management control signals to cause the power-receiving telecommunications interface to shut down certain functions in order to preserve backup power for essential "lifeline" services.

14 Claims, 7 Drawing Sheets

(58) Field of Classification Search
USPC .......................................................... 307/140
See application file for complete search history.

(56) References Cited

FOREIGN PATENT DOCUMENTS

| WO | WO 2009/138711 A1 | 11/2009 |
| WO | WO 2010/082016 A1 | 7/2010 |
| WO | WO 2012/032309 A1 | 3/2012 |
| WO | WO 2012/069788 A1 | 5/2012 |

OTHER PUBLICATIONS

PCT Written Opinion of the International Preliminary Examining Authority for PCT/GB2014/000214, mailed Jun. 17, 2015, 5 pages.
"Access, Terminals, Transmission and Multiplexing (ATTM): European Requirements for Reverse Powering of Remote Access Equipment Part 1 Architecture", ETSI Draft; Rev_Powering_Architecture, European Telecommunications Standards Institute (ETSI), 650, Route Des Lucioles; F-06921 Sophia-Antipolis; France, No. V1.1.1, Jan. 19, 2011, pp. 1-21, XP014062355.
European Search Report, Application No. EP 13250085, mailed Jan. 7, 2014, 1 page.
Alcatel-Lucent, "Reverse power feed start-up protocol," European Telecommunications Standards Institute (ETSI) (Aug. 23, 2013), XP014157965: pp. 1-4.
BT Group PLC, "Reverse power feed state machine for start-up," European Telecommunications Standards Institute (ETSI) (Feb. 27, 2013), XP014156153: pp. 1-2.
Extended European Search Report for corresponding EP App No. 13250132.1 mailed on May 19, 2014; 6 pages.
International Search Report for corresponding International Application No. PCT/GB2014/000527 mailed on Mar. 9, 2015; 3 pages.
Written Opinion for corresponding International Application No. PCT/GB2014/000527 mailed on Mar. 9, 2015; 5 pages.

REVERSE POWERING SYSTEM FOR TELECOMMUNICATIONS NODE

RELATED APPLICATIONS

The present application is a National Phase entry of PCT Application No. PCT/GB2014/000214, filed Jun. 5, 2014, which claims the benefit of EP Application No. 13250085.1, filed Jul. 23, 2013, each of which is incorporated herein by reference in its entirety.

TECHNICAL FIELD

Embodiments relate to a reverse powering system for telecommunications nodes. Embodiments provide a signaling mechanism between a power sink (ANU) and a power source arranged such that sufficient power is always available in a remote unit both from an individual line perspective and the global powering requirement of the ANU.

BACKGROUND

In a Fiber-to-the-Distribution Point (FttDP) system each remote node (Access Network Unit—ANU, also known as Distribution Point Unit—DPU), which provides the interface between the optical domain and the wired electrical connection into the customer premises, may be powered from an electricity supply located in the customers' premises, using the wired electrical connection. Several customers may be connected to the ANU and each could be operating under different power sink conditions depending upon the services that each customer is consuming.

International Patent specifications WO2009/138710, WO2009/138711, and WO2010/082016 describe a power supply system in which the power supply to be delivered by each user connected to an ANU is controlled such that users connected over short drop lengths provide proportionately more power to the ANU than those connected over longer drops. This reduces energy losses, because of the lower power losses on shorter (lower resistance) electrical connections (Power loss=$I^2R$, with R (resistance) proportional to the length of wire through which the current passes).

The reduced power draw on the longer connections also compensates those customers on the longer connections for the generally slower DSL service possible over the longer lines. However, the system described in the earlier references was isolated from the element management of the ANU and the state of the CPE (battery backup).

It is common for the ANU or distribution point to be located in a relatively inaccessible location such as on a pole, or in a locked curbside cabinet, and only accessible to trained and authorized personnel of the telecommunications service provider. It is therefore not practical to make adjustments to their settings manually, so a setting procedure is required that can be operated using control signals transmitted from a remote location.

When a connection is operational, signaling between the customer premises equipment and the ANU can be achieved using a management channel in the xDSL (digital subscriber line) protocols. However, at system start-up or following an interruption in connection there is no xDSL operating, and therefore no means of controlling the power collection function. Without power, the xDSL protocols cannot be used to communicate with the customer premises equipment to initiate the power collection function.

SUMMARY

Embodiments provide for much greater control of the reverse powering system, in particular during start-up.

According to a first aspect of embodiments, there is provided a power insertion system for a telecommunications interface unit for controlling the transmission of electrical power over a telecommunications connection between the interface unit and another interface unit, the power insertion unit comprising a control system for processing control signals controlling the power delivered over the telecommunications connection, and comprising a modem for the transmission of control messages between the interface units, the modem being configured to operate during a dormant phase using a communications protocol capable of operation on power scavenged by one of the interface units from the other interface unit over a high impedance connection indicative that the connection is intact, to allow the transmission of control messages between the interface units to initiate an active phase in which a larger power output can be transmitted over the telecommunications connection from the power-collecting telecommunications interface unit to the power-receiving telecommunications interface unit.

Two interface units, each having such a modem, can communicate with each other to deliver power to one of them from a power supply connected to the other. These will be referred to respectively as the power-receiving unit (or "sink") and the power-collecting unit (or "source"). The power-receiving unit ("sink") may be an optical network termination point for converting between electrical signals and optical signals. In use, during the dormant phase, the "sink" is not connected to an electricity supply other than the very low power (high impedance) connection from the source unit, and its modem operates on power scavenged from the telecommunications connection to power the modem. The source modem is connected to a power supply, but its modem should nevertheless operate on the low power protocol in order that the sink modem can co-operate with it.

In one advantageous arrangement, the low-power protocol is only used to set up the power delivery system, to allow a second, high speed, connection to then operate once the full power supply has been initiated.

In one advantageous arrangement, the power collecting unit transmits a beacon signal when it is connected to a power supply, and the power receiving unit, when in a standby mode, monitors the telecommunications connection for such beacons and responds when it detects one. The power-collecting unit is therefore required to use only a small amount of power when in the "standby" mode, until it is connected to a power supply. This can typically be provided by a battery.

The control system may also be configured to exchange signals in the event of a loss of power, either intentional or otherwise, at the power-collecting unit, in order to manage a "graceful" shutdown and return the power-receiving unit into the standby mode.

According to another aspect of embodiments, there is provided a method of controlling transmission of electrical power, over a telecommunications connection, to a power-receiving telecommunications interface unit from a power-collecting telecommunications interface unit connectable to a power supply, wherein during a dormant phase a high impedance connection is provided between the interface units indicative that the connection is intact, and an active phase is initiated by transmitting control messages between the interface units using a communications protocol capable of operation on power scavenged by the power-receiving interface unit from the high impedance circuit, the control messages initiating the transmission of a larger power output over the telecommunications connection from the power-collecting telecommunications interface unit to the power-receiving telecommunications interface unit.

In one advantageous arrangement, the power signaling system is integrated into the start-up protocol and also into the element management of the ANU so that OSS systems are aware of the current state of ANU system power, for example if the CPE has lost its local mains power feed and is currently operating in standby battery backup mode.

BRIEF DESCRIPTION OF THE DRAWINGS

An embodiment will now be described, by way of example, with reference to the accompanying drawings in which.

DETAILED DESCRIPTION

Figure 1:
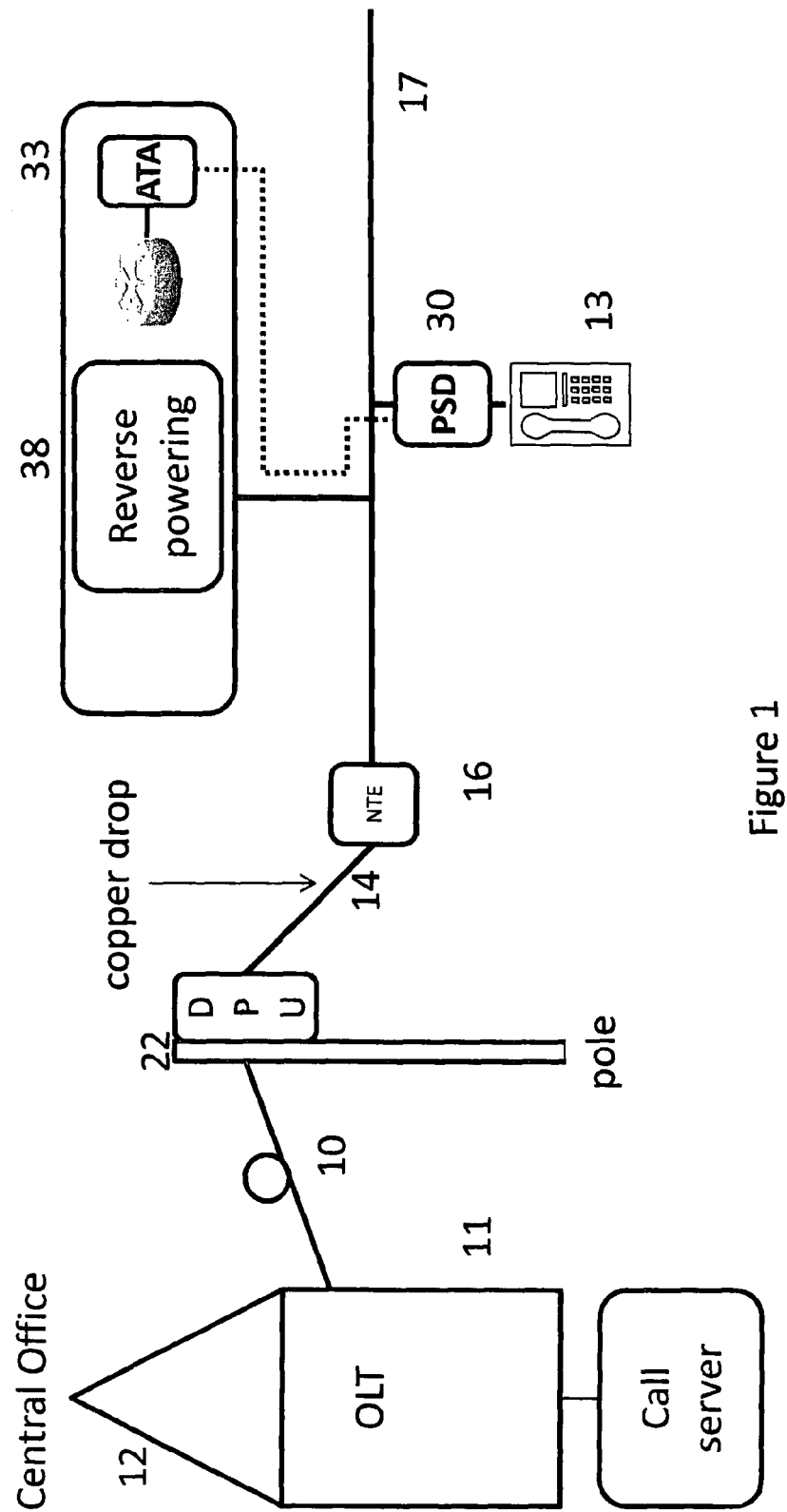
FIG. 1 illustrates a Fiber-to-the-Distribution-Point installation.

FIG. 1 shows a typical a Fiber-to-the-Distribution-Point (FttDP) architecture with a Gigabit Passive Optical Network (GPON) backhaul. The optical line termination (OLT) 11 of the GPON is located in a Central Office 12 and is connected to a remote distribution point (DPU) 22 via the optical fiber/PON infrastructure 10. The DPU is typically located on a pole, with an overhead drop wire 14 connecting to the individual customer premises 15.

The DPU 22 is connected to the network-side of the master-socket (network termination equipment—NTE) 16 in the customers' premises (NTE) via the existing copper drop wire 14. The customer premises equipment 32 is connected to the customer-side of the NTE. The customer premises equipment 32 comprises a number of elements 33-39 (shown in more detail in FIG. 3) communicating with each other and the DPU 22 through the home wiring network 17. These include a Reverse Power Feed (RPF) source 38 and a baseband voice service which is generated by an Analogue Terminal Adapter (ATA) 33.

Typically, a remote power feed will conflict with the d.c. signaling which is usually used in analogue telephony ("plain old telephone service"—POTS) to signal off-hook and on-hook telephone conditions, so when such a power feed is provided, it is necessary to provide a special adapter 30 known as a POTS Signaling Dongle (PSD) to each normal telephone handset 13. These devices co-operate with the ATA 33 in order to allow the POTS signaling to be carried in the presence of a d.c. remote power feed. Some versions also generate the ringing signal for the attached telephone handset 13.

Throughout FIGS. 2 to 5, the suffixes "O" and "R" are used respectively for the network ("Office") end and the customer ("Remote") end.

Figure 2:
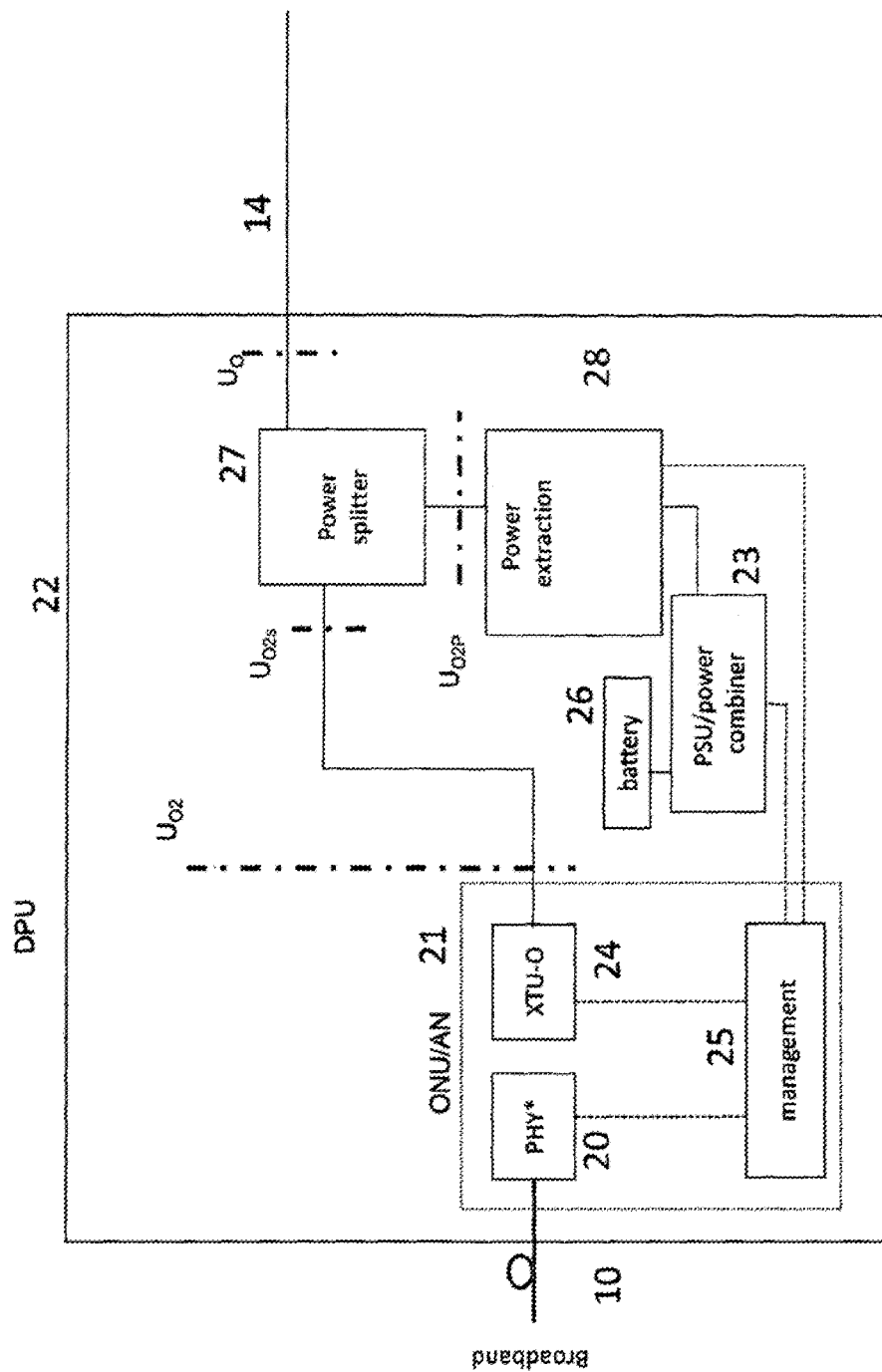
FIG. 2 shows a conventional distribution point in more detail.
Figure 3:
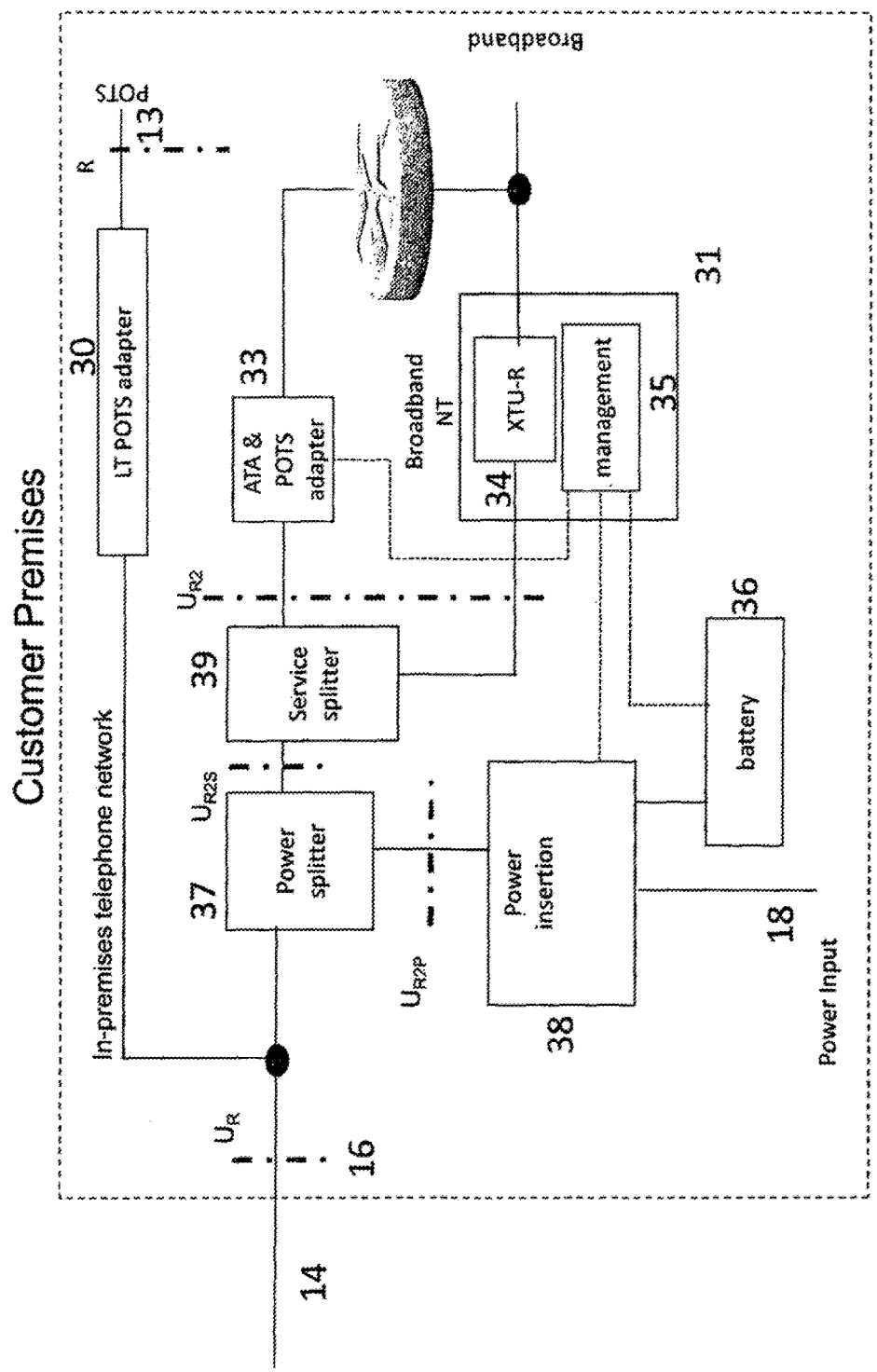
FIG. 3 shows a conventional customer premises system in more detail.

FIG. 2 shows the distribution point 22 of FIG. 1 in more detail, and FIG. 3 likewise depicts the customer premises equipment 32. These are connected to each other by the drop wire 14, at the interfaces marked respectively $U_O$ and $U_r$. In particular, FIGS. 2 and 3 depict the management entities located respectively in the DPU 22 and the Customer Premises 32.

The DPU 22 comprises an optical network unit (ONU) 21 for converting between optical signals conveyed over the optical fiber backhaul 10 through a backhaul termination 20 and xDSL signaling conveyed through an "xDSL terminating unit O" (XTU-O) 24 to the drop wire 14.

In the CPE 32 corresponding components are used to convert xDSL signals into signals usable by the end-user. In particular, the xDSL terminating unit-R (XTU-R) 34 acts as a modem for the xDSL service whilst the Analog terminal adapter (ATA) 33 in the xDSL network termination unit 31 co-operates with the POTS adapter 30 connected to a standard telephone 31 to allow normal voiceband traffic. A service splitter 39 separates traffic for the ATA 33 and traffic for the network termination 34

Electrical power is required to operate the ONU 21. As the connection to the central office 12 is by way of an optical, not electrical, connection it is not possible to power the DPU, nor the customer premises equipment 32, from the central office 12 as is conventional. Nor is it generally convenient to install a dedicated supply to the DPU 22, which may be located at some distance from a suitable mains feed. Instead, electrical power is drawn from an input 18 connected to a power insertion unit 38 in the customer premises equipment 32, and used to power both the XTU-R 34 in the network termination 31 of the customer premises equipment 32, and the XTU-O 24 in the optical network unit 21 of the distribution point 22.

Power is delivered to the DPU 22 from the power insertion unit 38 in the customer premises equipment 32 by way of the same electrical drop wire 14 that carries communications data. At each end of the drop wire 14 a respective power splitter 27, 37 is provided which separates the power supply from the xDSL or other communications streams. In a typical arrangement, the xDSL is carried as an ac modulation summed with a dc power supply.

The power drawn by the DPU 22 is extracted by an extraction unit 28.

The CPE 32 is provided with a battery 36 to maintain service in the event of failure of the power input 18. Similarly, the DPU 22 is provided with a battery 26 and power combiner 23 to maintain service in the event of failure of the customer premises equipment 32 or the connection 14. Respective power management systems 25, 35 control the flow of electrical power between the various electrical components. In particular they may be used to control how much of the power required to operate the equipment in the distribution point 22 should be drawn from each of several customer premises 32, taking into account factors such as the number of operational customer premises equipments currently capable of delivering power, the volume of traffic each is carrying, and electrical losses in each of the respective drop wire connections 14.

In normal use, management information can be transmitted between the power management systems 25, 35 of the DPU 22 and the or each customer premises equipment 32 via the same DSL service that is used for data transmission, i.e., using the "xDSL terminating unit O" (XTU-O) 24 and "xDSL terminating unit R" (XTU-R) 34.

This same system can also be used to monitor and control power usage from the CPE 32 to DPU 22 and also interface generally the RPF sub-system with the element management of the system. This power control/monitoring system is especially useful in the case of mains power failure at the CPE and operating is occurring under battery power, i.e., the power system can 'tell' the XTU-O 24 and XTU-R 34 to operate in a low-power state.

However, the power management system cannot be operated over the xDSL system unless that system is in operation. When the customer premises equipment is first started up, or restarted after being switched off, or after reconnection of the drop wire 14, the xDSL system cannot operate until the DPU 22 is drawing power through the power extraction unit. In particular, when the system is in the initiation phase another signaling and transmission system is required to coordinate the delivery of electrical power from the CPE 32 to the DPU 22. Such an arrangement is depicted in FIGS. 4 and 5, which respectively illustrate the modifications made to the distribution point of FIG. 2 and the customer equipment of FIG. 3 in order to put embodiments into effect.

A principal difference is the provision of a respective secondary communications modem 45, 55 in each of the power extraction unit 28 in the distribution point 22 and the power insertion unit 38 in the customer premises equipment 32.

Figure 4:
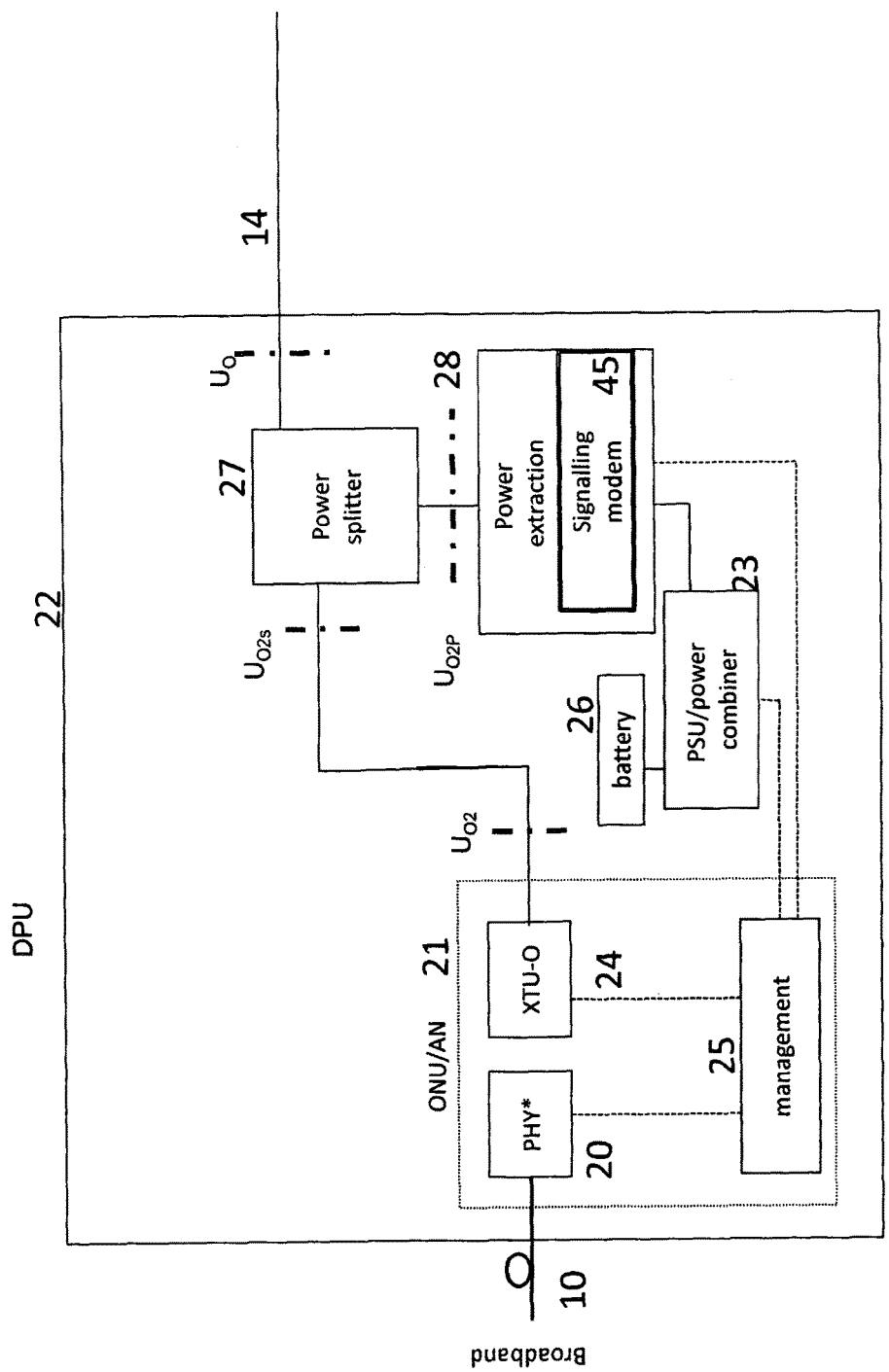
FIG. 4 shows a distribution point modified according to an embodiment.
Figure 5:
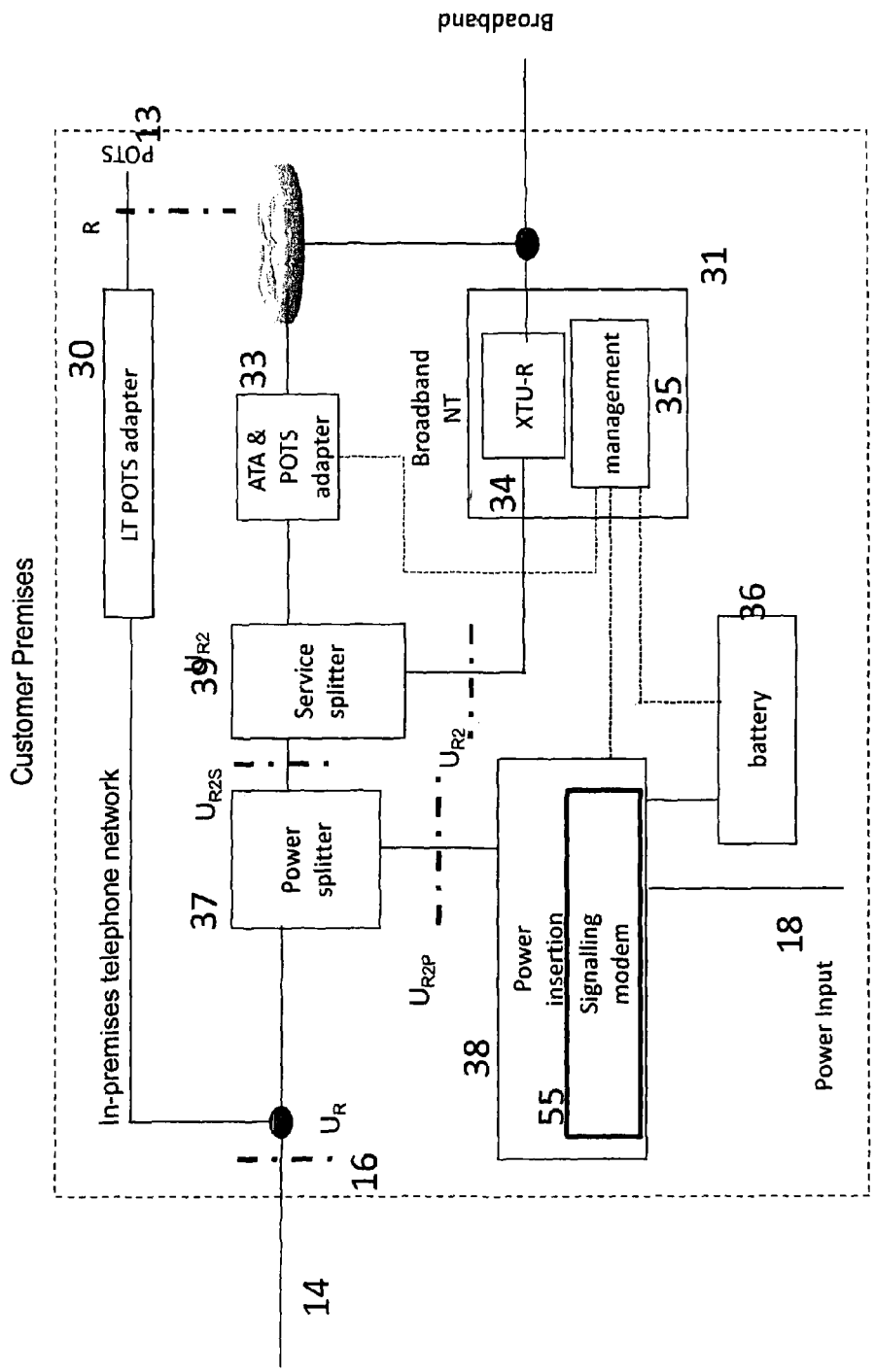
FIG. 5 shows a customer premises system modified according to an embodiment.

FIGS. 4 and 5 show the respective power signaling modems 45, 55 in the DPU 22 and the CPE 32. Both modems are connected via the respective power splitters 27, 37 which perform a frequency division duplexing arrangement to split/merge the signaling from the DSL systems 21, 31 used for data transport and the d.c. powering arrangement 28, 38. Both signaling modems are also connected to the respective management entities 25, 35 at each location.

Until the power initialization system is fully operational, the remote power signaling modem 45 in the DPU can only operate in a low power mode using scavenged power, that is power transmitted from the CPE to the remote unit before the remote unit has 'officially' come to life. Typically the CPE would might supply a small current and voltage (a few milliwatts—i.e., the remote node presents a very high impedance) to indicate that the connection is present. The secondary communications modem 45 in the remote unit 22 is arranged to operate on the low power available in such a situation. The secondary communications modem 55 in the customer premises equipment 32 is not subject to such power constraints, as it will only be required to operate when the user requires it, at which time it is connected to a power supply 18. It is therefore convenient for the customer premises system to control the operation of embodiments, and to transmit instructions to the distribution point, rather than vice versa.

Figure 6:
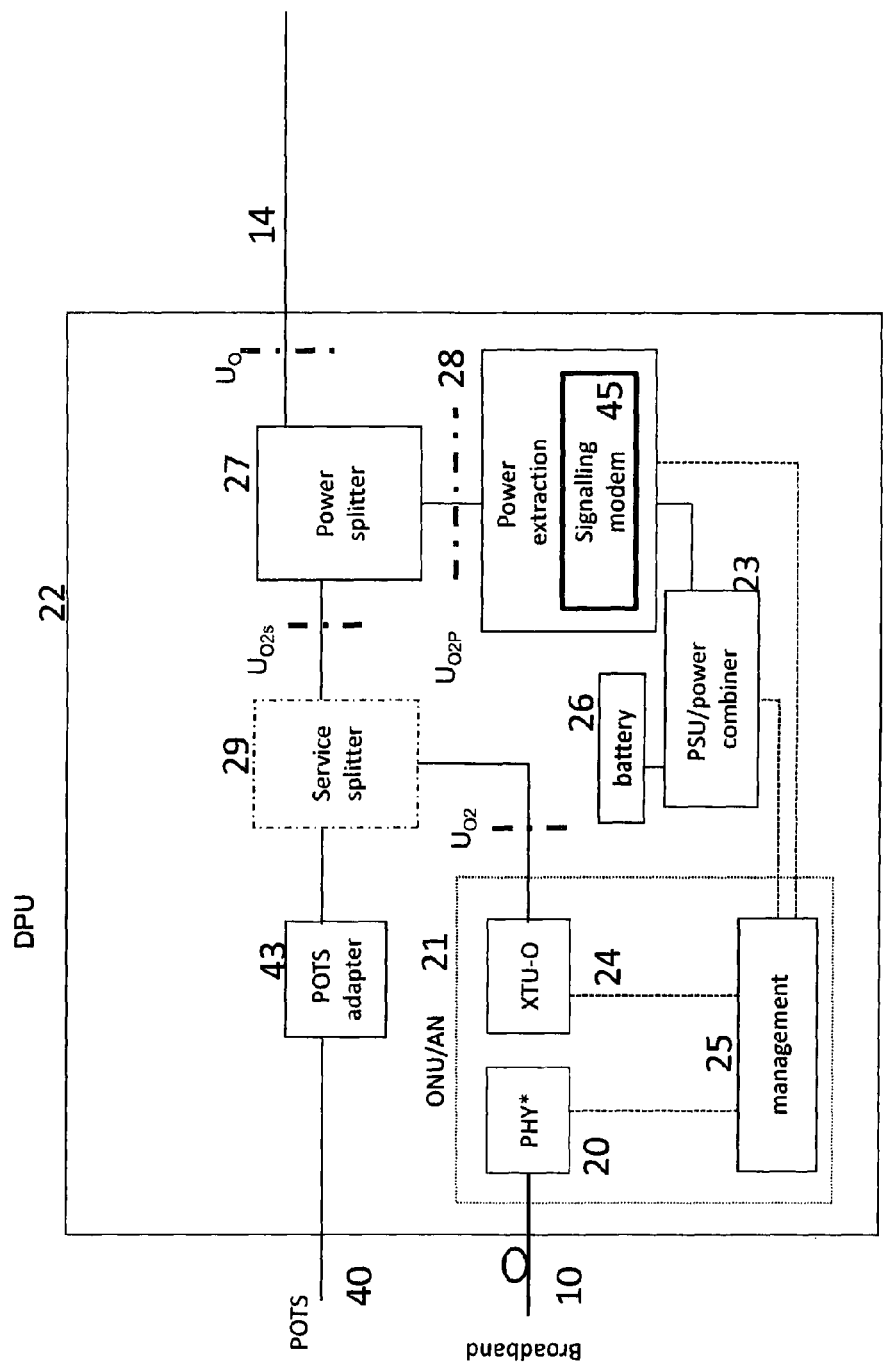
FIG. 6 shows a variant of the distribution point modified according to an embodiment.

An alternative approach is depicted in FIG. 6, and is possible if a POTS (traditional telephony) connection 40 is available on the network side 11 of the distribution point 22, as is often the case in the legacy network. In this approach, the POTS line 40 can be connected to the remote unit 22. This is connected to the drop wire connection 14 through the power splitter 27. As shown, a POTS adapter 43 and service splitter 29 are also provided so that traditional voice calls can be carried over the "copper" POTS service if desired, or as a contingency to ensure basic telephony service is still available in the event of a power failure.

The signaling modems 45, 55 may communicate between each other using any suitable protocol, for example the "1-wire protocol" developed by Dallas Semiconductor Corp. This system includes a parasitic powering capability at the remote device, so no separate power supply is required at the remote end in order for communication to commence. This signaling could be used to communicate to the CPE that a suitable device is present at the remote end and that reverse powering can commence. The data-rate of this technique is sufficiently low that it would not interfere with the G.hs (handshake) signaling that the G.fast or VDSL2 would use in establishing the full xDSL connection.

Alternatively, G.hs tones could be used for the remote power signaling system. In this case the protocol would have to be incorporated into the xDSL chipsets.

Figure 7:
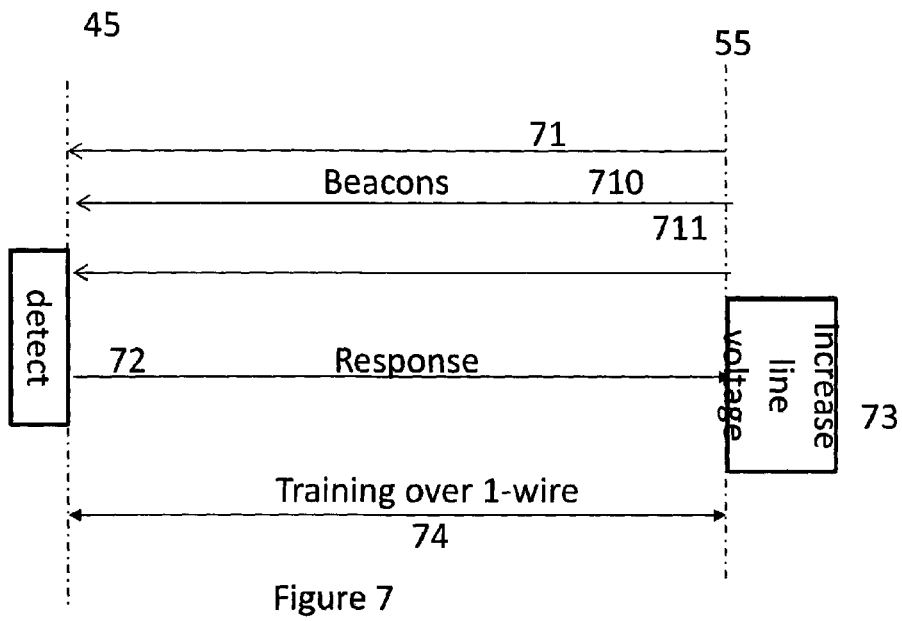
FIG. 7 is a sequence diagram depicting a start-up process performed by an embodiment.
Figure 8:
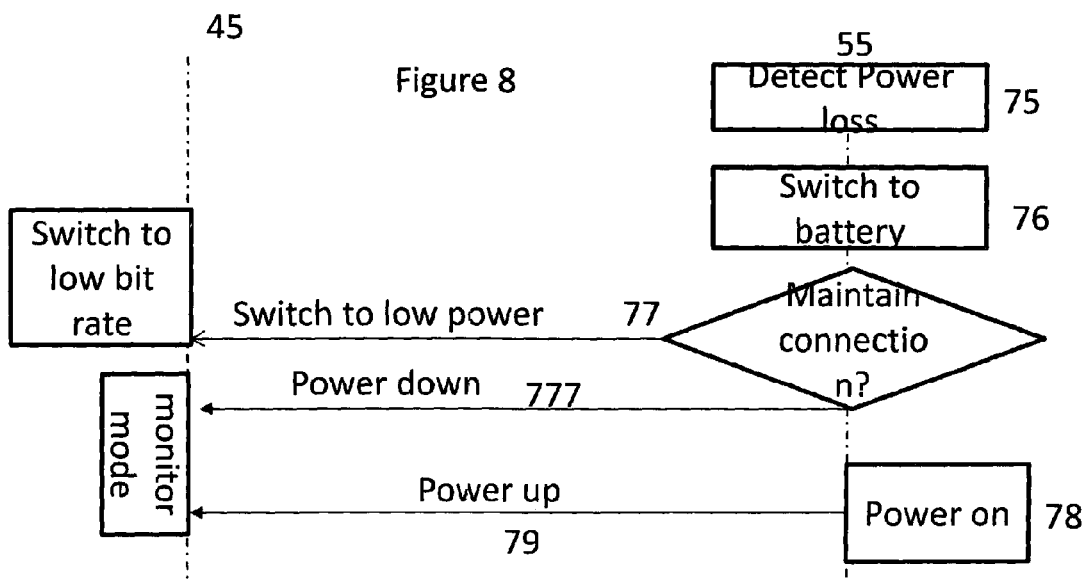
FIG. 8 is a sequence diagram depicting power-down processes performed by an embodiment.

A method of operation is depicted in FIG. 7 and FIG. 8. As depicted in FIG. 7, when the CPE is first powered up (at 70), the CPE secondary modem 55 sends out a scan signal 71 to the DPU 22 seeking a response from the corresponding secondary modem 45 in the DPU. At this stage only a low voltage is applied to the line (say 20V) which is current limited to say 60 mA. If no response is received, the scan signal is repeated (710, 711 . . . ), until either a response is received or the system is powered down again.

If a secondary modem 45 is present in the DPU, it returns an acknowledgement signal 72 to the CPE secondary modem 55. This acknowledgement 72 indicates to the modem 55 that the modem 45 (and thus the power extraction unit 28) is present on the line, and that the power output across the connection 14 can safely be increased without damage to other components in the DPU or further into the network (as would be the case, for example, if only a standard POTS connection were connected to the DPU 22)

The secondary modem 55 in the CPE 32 next increases the source voltage and increases its current limit (e.g., 60V, 350 mA), thus allowing normal operation of the remote unit 45. The remote unit 45, detecting the increased voltage, initiates a training process 74 to initiate the power insertion and extraction processors 38, 28, in particular to match the impedances so that the power drawn matches the power delivered. The signaling system monitors the power that is being transmitted over the link 14 and reports this to the element management system 35.

FIG. 8 depicts processes that occur should the CPE power insertion unit 38 detect a failure of the power supply 19 (at 75), it switches to battery backup mode (76), and transmits a signal (77) to the DPU 22 to cause the XTU-O 24 to switch into a 'Low Power Mode', in which the data rate is reduced significantly in order to save power consumption in both the CPE 32 and the DPU 22. This will allow the battery life to be extended to allow a low bitrate (or analogue) 'lifeline' service to be maintained either using the POTS connection 40 (FIG. 6) if one is present or, otherwise, using the optical link 10, 20, 24 in a low power mode. When the power 18 is restored to the CPE 32 this is signaled from the CPE to the DPU 22 (79) to allow the remote unit 24 to revert back to normal operating conditions.

During deliberate power-down of the CPE 32 (step 75), sufficient energy is stored in its battery 36 or a capacitor to enable a message 777 to be sent to the remote unit 28 which causes it to be powered down gracefully, and also instructs the element manager 45 to switch to the standby listening mode, to await a beacon 71 from the CPE 32 indicating that it has powered up again.

The invention claimed is:

1. A method of controlling transmission of electrical power, over a telecommunications connection, to a power-receiving telecommunications interface unit from a power-collecting telecommunications interface unit connectable to a power supply, wherein during a dormant phase a high impedance connection is provided between the interface units, the presence of which is indicative that the telecommunications connection is intact, and an active phase is initiated by transmitting control messages between the interface units using a communications protocol capable of operation on power scavenged by the power-receiving interface unit from the high impedance circuit, the control messages initiating the transmission of a larger power output over the telecommunications connection from the power-collecting telecommunications interface unit to the power-receiving telecommunications interface unit.

2. A method according to claim 1, wherein, when the transmission of the larger power output has been initiated, a higher speed exchange of data between the interface units is enabled.

3. A method according to claim 1, wherein a low-powered beacon signal is transmitted over the telecommunications connection by the power-collecting telecommunications interface unit on connection to a power supply, and the power-receiving telecommunications interface unit is responsive to the beacon signal to generate a response for transmission back over the telecommunications connection.

4. A method according to claim 1, wherein a power management control signal is transmitted by the power-collecting telecommunications interface unit in response to a loss of connection to a power supply, and the power-receiving telecommunications interface unit shuts down predetermined functions in response to the power management control signal indicative of a loss of power.

5. A method according to claim 1, wherein the power-receiving telecommunications interface unit is an optical network termination point for converting between electrical signals to optical signals.

6. A power insertion system for a telecommunications interface unit for controlling the transmission of electrical power over a telecommunications connection from a first, power collecting, interface unit and a second, power-receiving interface unit, the first, power collecting, interface unit comprising a control system for processing control signals controlling the power delivered over the telecommunications connection, and comprising a modem for the transmission of control messages between the interface units, the modem being configured to operate doting a dormant phase using a communications protocol capable of operation on power scavenged by the second unit from the first interface unit over a high impedance connection, the presence of which is indicative that the connection is intact, to allow the transmission of control messages between the interface units to initiate an active phase in which a larger power output can be transmitted over the telecommunications connection from the first, power-collecting, telecommunications interface unit to the second, power-receiving, telecommunications interface unit.

7. A power insertion system according to claim 6, having a second modem for higher speed exchange of data between the interface units when the transmission of the larger power output has been initiated.

8. A power insertion system according to claim 6, incorporated in a power-collecting telecommunications interface unit connectable to a power supply, such that power may be delivered over the telecommunications connection to a corresponding power-receiving unit.

9. A power insertion system according to claim 8, wherein the control system is arranged to transmit a low-powered beacon signal over the telecommunications connection on connection to a power supply.

10. A power insertion system according to claim 8, wherein the control system is arranged to transmit power management control signals in response to a loss of power.

11. A power insertion system according to claim 6, incorporated in a power-receiving telecommunications interface unit capable of receiving electrical power over a telecommunications connection from a corresponding power-collecting unit.

12. A power insertion system according to claim 11, wherein the telecommunications interface unit is an optical network termination point for converting between electrical signals and optical signals.

13. A power insertion system according to claim 11, wherein the control system has a detection unit for detecting a low-powered beacon signal received over the telecommunications connection, and generating a response for transmission back over the telecommunications connection.

14. A power insertion system according to claim 11, wherein the control system is arranged to shut down predetermined functions in the telecommunications interface unit in response to a power management control signal indicative of a loss of power.

* * * * *